United States Patent
Masuda (10) Patent No.: US 8,653,788 B2
(45) Date of Patent: Feb. 18, 2014

(54) CHARGING CABLE AND CHARGING SYSTEM FOR ELECTRICALLY POWERED VEHICLE

(75) Inventor: Tomokazu Masuda, Kasugai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 220 days.

(21) Appl. No.: 13/258,032

(22) PCT Filed: Jun. 24, 2009

(86) PCT No.: PCT/JP2009/061444
§ 371 (c)(1),
(2), (4) Date: Sep. 21, 2011

(87) PCT Pub. No.: WO2010/150359
PCT Pub. Date: Dec. 29, 2010

(65) Prior Publication Data
US 2012/0091957 A1  Apr. 19, 2012

(51) Int. Cl.
*H01M 10/46* (2006.01)
(52) U.S. Cl.
USPC .......................................................... 320/109
(58) Field of Classification Search
USPC ......................................... 320/107, 109, 111
See application file for complete search history.

(56) References Cited

U.S. PATENT DOCUMENTS

| | | | |
|---|---|---|---|
| 5,458,496 A | 10/1995 | Itou et al. | |
| 5,556,284 A | 9/1996 | Itou et al. | |
| 5,563,491 A * | 10/1996 | Tseng | 320/109 |
| 5,577,920 A | 11/1996 | Itou et al. | |
| 5,637,977 A | 6/1997 | Saito et al. | |
| 5,751,135 A | 5/1998 | Fukushima et al. | |
| 5,816,643 A | 10/1998 | Itou et al. | |
| 2009/0102433 A1 | 4/2009 | Kamaga | |
| 2011/0055037 A1 * | 3/2011 | Hayashigawa et al. | 320/109 |

FOREIGN PATENT DOCUMENTS

| | | |
|---|---|---|
| JP | A-07-067210 | 3/1995 |
| JP | A-09-161898 | 6/1997 |
| JP | A-10-262340 | 9/1998 |
| JP | A-2009-106053 | 5/2009 |

OTHER PUBLICATIONS

SAE Electric Vehicle Conductive Charge Coupler, SAE Standards, SAE International, Nov. 2001.
International Search Report issued in International Application No. PCT/JP2009/061444 dated Sep. 8, 2009.

* cited by examiner

*Primary Examiner* — Edward Tso
(74) *Attorney, Agent, or Firm* — Oliff PLC (57) ABSTRACT

A charging cable includes a charging connector configured to be connectable to a vehicular inlet. The charging connector includes a lock button for locking the charging connector onto the charging inlet; a limit switch configured to be switchable, according to an operation onto the lock button, between a first state in which a control pilot wire and a ground wire are connected to each other and a second state in which a cable connection signal wire and the ground wire are connected to each other; and a lighting device configured to be capable of being driven according to a signal in a signal wire connected via a limit switch.

10 Claims, 6 Drawing Sheets

CHARGING CABLE AND CHARGING SYSTEM FOR ELECTRICALLY POWERED VEHICLE

TECHNICAL FIELD

The present invention relates to a charging cable and a charging system for an electrically powered vehicle, more particularly, a charging cable and a charging system for an electrically powered vehicle, both of which is used to charge an electrically powered vehicle configured so that its power storage device for vehicular driving is chargeable from a power source external to the vehicle.

BACKGROUND ART

As environmentally friendly vehicles, electrically powered vehicles have been drawing attention in recent years, such as electric vehicles, hybrid vehicles, and fuel cell vehicles. Each of these electrically powered vehicles has a motor for generating driving power for traveling, and a power storage device for storing electric power supplied to the motor. A hybrid vehicle refers to a vehicle having a motor and an internal combustion engine as motive power sources. A fuel cell vehicle refers to a vehicle having a fuel cell as a direct-current power source for driving the vehicle.

For such an electrically powered vehicle, a technique is proposed to charge the power storage device for driving the vehicle, by means of a commercial power source having high power generation efficiency. Particularly drawing attention is a technique of charging a power storage device mounted on an electrically powered vehicle, using a source of commercial electric power supplied to general houses (for example, a source of supplying a relatively low voltage of 100 V or 200 V).

As a charging system for such an electrically powered vehicle, SAE Electric Vehicle Conductive Charge Coupler (NPL 1) provides standard specifications for a vehicular inlet and a charging connector to facilitate shared usage of a charging cable and a connector among different vehicles.

CITATION LIST

Non Patent Literature

NPL 1: SAE Electric Vehicle Conductive Charge Coupler, (the United States), SAE Standards, SAE International, November, 2001

SUMMARY OF INVENTION

Technical Problem

In starting to charge the above-described electrically powered vehicle at nighttime, it is difficult to connect the charging connector to the vehicular inlet if the surroundings of the vehicular inlet are dark. In order to address this, an illumination device is provided in the charging connector to illuminate the vehicular inlet, thus facilitating the operation of connecting the charging connector thereto.

Further, when a presentation device is provided therein to present a state of the power storage device, a user can figure out whether the power storage device is being charged at present or has finished to be charged, thus achieving improved user-friendliness.

However, implementation of these functions requires a power source and wires dedicated to supplying a power source voltage to the illumination device and the presentation device. Particularly, when the dedicated power source and wires are incorporated in the charging connector, a scale of a circuit contained in the charging connector will likely be increased.

The present invention is made to solve the problem, and its object is to provide a charging cable and a charging system for an electrically powered vehicle, each of which has a simple configuration and is capable of driving a lighting device.

Solution to Problem

According to a certain aspect of the present invention, a charging cable connects a power source external to an electrically powered vehicle to the electrically powered vehicle, in order to charge a power storage device mounted on the electrically powered vehicle from the power source. The charging cable includes: a charging connector configured to be connectable to a charging inlet provided in the electrically powered vehicle; a plug configured to be connectable to the power source; and an electric wire unit provided between the charging connector and the plug. The electric wire unit includes a power line for supplying electric power from the power source to the electrically powered vehicle; a first control wire for communicating a control signal representing information regarding electric power supplied to the electrically powered vehicle; and a ground wire connected to a vehicular earth. The charging connector includes a lock button for locking the charging connector onto the charging inlet; a switching circuit configured to be switchable, according to an operation onto the lock button, between a first state in which the first control wire and the ground wire are connected to each other and a second state in which a second control wire for communicating a connection signal and the ground wire are connected to each other, the connection signal indicating a connection state of the charging cable; and a lighting device configured to be capable of being driven according to a signal in a corresponding control wire upon at least one of the first state and the second state.

Preferably, the lock button is operable between a lock state and a release state. The switching circuit is brought into the first state upon the release state, and is brought into the second state upon the lock state.

Preferably, the second control wire is configured to be capable of changing a potential of the connection signal according to a state as to whether or not the power storage device is being charged, when the charging connector is connected to the charging inlet. The lighting device is provided between the switching circuit and the ground wire and is configured to illuminate the charging inlet.

Preferably, the second control wire is configured to be capable of changing a potential of the connection signal according to a state as to whether or not the power storage device is being charged, when the charging connector is connected to the charging inlet. The lighting device is provided between the switching circuit and the second control wire.

According to another aspect of the present invention, a charging system for an electrically powered vehicle is configured to be capable of charging a power storage device mounted on an electrically powered vehicle from a power source external to the vehicle. The charging system includes a charging cable for connecting the power source to the electrically powered vehicle; a charging inlet provided in the electrically powered vehicle and configured to allow the charging cable to be connected thereto; a connection signal generating circuit provided in the electrically powered vehicle and configured to be capable of generating a connection signal indicating a connection state of the charging cable; and a charging device mounted on the charging cable and configured to be capable of generating a control signal representing information regarding electric power supplied to the electrically powered vehicle and transmitting the control signal to the electrically powered vehicle. The charging cable includes a charging connector configured to be connectable to the charging inlet; a plug configured to be connectable to the power source; and an electric wire unit provided between the charging connector and the plug. The electric wire unit includes a power line for supplying electric power from the power source to the electrically powered vehicle; a first control wire for communicating the control signal, and a ground wire connected to a vehicular earth. The charging connector includes a lock button for locking the charging connector onto the charging inlet; a switching circuit configured to be switchable, according to an operation onto the lock button, between a first state in which the first control wire and the ground wire are connected to each other and a second state in which a second control wire for communicating the connection signal and the ground wire are connected to each other; and a first lighting device configured to be capable of being driven according to a signal in a corresponding control wire, upon at least one of the first state and the second state.

Preferably, the lock button is operable between a lock state and a release state. The switching circuit is brought into the first state upon the release state, and is brought into the second state upon the lock state.

Preferably, the connection signal generating circuit is configured to be capable of changing a potential of the connection signal according to a state as to whether or not the power storage device is being charged, when the charging connector is connected to the charging inlet. The first lighting device is provided between the switching circuit and the ground wire, and is configured to illuminate the charging inlet.

Preferably, the connection signal generating circuit is configured to be capable of changing a potential of the connection signal according to a state as to whether or not the power storage device is being charged, when the charging connector is connected to the charging inlet. The first lighting device is provided between the switching circuit and the second control wire.

Preferably, the charging inlet includes a second lighting device configured to be capable of being driven according to the connection signal in the second control wire, upon the second state.

Advantageous Effects of Invention

According to the present invention, a charging cable and a charging system for an electrically powered vehicle can be implemented each of which has a simple configuration and is capable of driving a lighting device.

DESCRIPTION OF EMBODIMENTS

Referring to figures, embodiments of the present invention will be described in detail below. It should be noted that the same reference characters in the figures indicate the same or equivalent parts.

Figure 1:
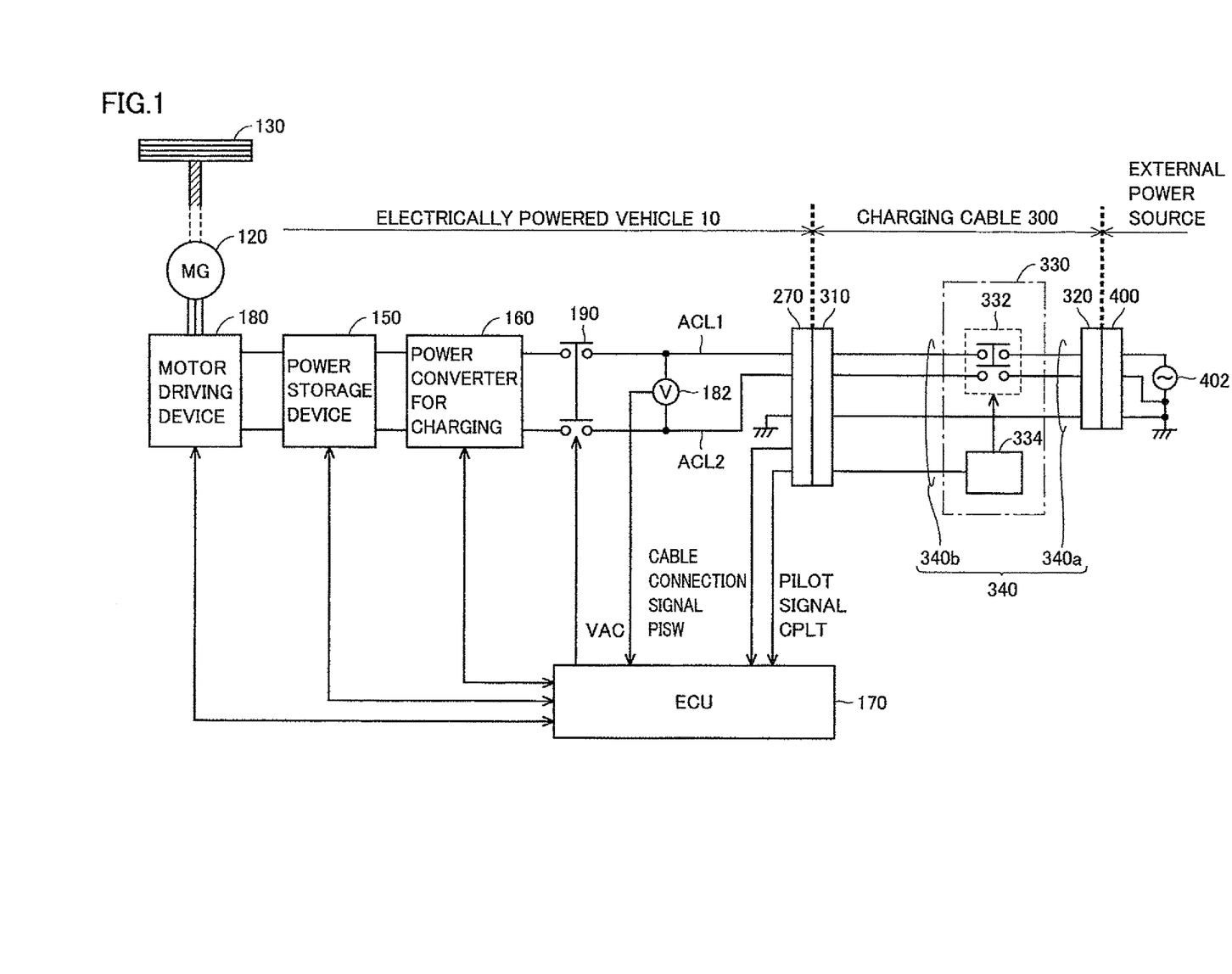
FIG. 1 is a schematic diagram of a charging system for an electrically powered vehicle according to an embodiment.

FIG. 1 is a schematic diagram of a charging system for an electrically powered vehicle 10 according to the present embodiment. It should be noted that electrically powered vehicle 10 is not particularly limited in its configuration as long as it is capable of traveling using electric power supplied from its power storage device chargeable by an external power source. Examples of electrically powered vehicle 10 include a hybrid vehicle, an electric vehicle, a fuel cell vehicle, and the like.

Referring to FIG. 1, electrically powered vehicle 10 includes a power storage device 150 for storing electric power used to generate driving power for the vehicle; a motor generator (hereinafter, also referred to as "MG") 120 for generating driving power; a motor driving device 180 for controlling driving of MG 120 using electric power stored in power storage device 150; vehicular wheels 130 that receive the driving power generated by MG 120; and a control device (hereinafter also referred to as "ECU (Electronic Control Unit)") 170 for controlling general operations of electrically powered vehicle 10.

For charging from the external power source, electrically powered vehicle 10 includes a vehicular inlet 270 provided at a body of electrically powered vehicle 10; a relay 190; and a power converter 160 allowing power storage device 150 to be charged by the external power source. Power converter 160 is connected to vehicular inlet 270 via relay 190 by power lines ACL1, ACL2, and is also connected to power storage device 150. Provided between power lines ACL1 and ACL2 is a voltage sensor 182. Voltage sensor 182 provides a result of detection of a voltage (voltage from the external power source) to ECU 170. Further, ECU 170 receives a cable connection signal PISW and a pilot signal CPLT both sent from the charging cable 300 side via vehicular inlet 270.

Power storage device 150 is a power storage element configured to be chargeable/dischargeable. Power storage device 150 is constituted by, for example, a secondary battery such as a lithium ion battery or a nickel hydrogen battery, or by a power storage element such as an electric double layer capacitor. Further, power storage device 150 further includes a voltage sensor (not shown) connected between the power lines connected to power storage device 150, and a current sensor (not shown) connected to a power line of a positive electrode side or a negative electrode side. ECU 170 receives output voltage and current signals each detected by these sensors.

Power converter 160 for charging is controlled by ECU 170 to convert alternating-current power supplied from external power source 402 via charging cable 300, vehicular inlet 270, power lines ACL1, ACL2, and relay 190, into direct-current power for charging power storage device 150. It should be noted that power storage device 150 can be configured to be directly charged with electric power supplied from external power source 402. In this case, power converter 160 is not provided.

Motor driving device 180 is controlled by ECU 170 to convert electric power stored in power storage device 150, into electric power for controlling driving of MG 120. Representatively, MG 120 is constituted by a permanent magnet type three-phase synchronous motor, and motor driving device 180 is constituted by a three-phase inverter. Output torque of MG 120 is transmitted to vehicular wheels 130 via a power split device and a speed reducer which are not shown, thus traveling electrically powered vehicle 10.

MG 120 can generate electric power using rotation force of vehicular wheels 130, upon regenerative braking operations of electrically powered vehicle 10. The electric power thus generated can be used to charge power storage device 150 using motor driving device 180.

Further, in a hybrid vehicle having an engine (not shown) in addition to MG 120, the engine and MG 120 are operated cooperatively to generate required driving power for the vehicle. In this case, electric power generated by rotation of the engine can be used to charge power storage device 150.

Charging cable 300 includes a charging connector 310 for the vehicle, a plug 320 for the external power source, a charging circuit interrupt device (hereinafter, abbreviated as "CCID") 330, and an electric wire unit 340 for connecting the devices to each other for input/output of electric power and control signals. Electric wire unit 340 includes an electric wire unit 340a for connecting plug 320 and CCID 330 to each other, and an electric wire unit 340b for connecting charging connector 310 and CCID 330 to each other.

Charging connector 310 is configured to be connectable to vehicular inlet 270 provided at the body of electrically powered vehicle 10. Inside charging connector 310, a limit switch (not shown) is provided to detect connection of charging connector 310. When charging connector 310 is connected to vehicular inlet 270, the limit switch is operated and ECU 170 receives cable connection signal PISW, which indicates that charging connector 310 has been brought into connection with vehicular inlet 270.

Plug 320 is connected to a power source receptacle 400 provided in, for example, a house. Power source receptacle 400 is supplied with alternating-current power from external power source 402 (for example, system power source).

CCID 330 includes a CCID relay 332 and a control pilot circuit 334. CCID relay 332 is provided for a pair of power lines within charging cable 300. CCID relay 332 is controlled to be on/off, by control pilot circuit 334. When CCID relay 332 is off, the electric power path is disconnected within charging cable 300. On the other hand, when CCID relay 332 is on, electric power can be supplied from external power source 402 to electrically powered vehicle 10.

Control pilot circuit 334 outputs pilot signal CPLT to ECU 170 of the vehicle via charging connector 310 and vehicular inlet 270. Pilot signal CPLT is a signal sent from control pilot circuit 334 to notify the vehicle's ECU 170 of a rated current of the charging cable. Pilot signal CPLT is also used as a signal for remotely controlling CCID relay 332 from ECU 170 based on a potential of pilot signal CPLT controlled by ECU 170. Based on change in the potential of pilot signal CPLT, control pilot circuit 334 controls CCID relay 332 to be on/off. In other words, pilot signal CPLT is exchanged between ECU 170 and CCID 330.

Figure 2:
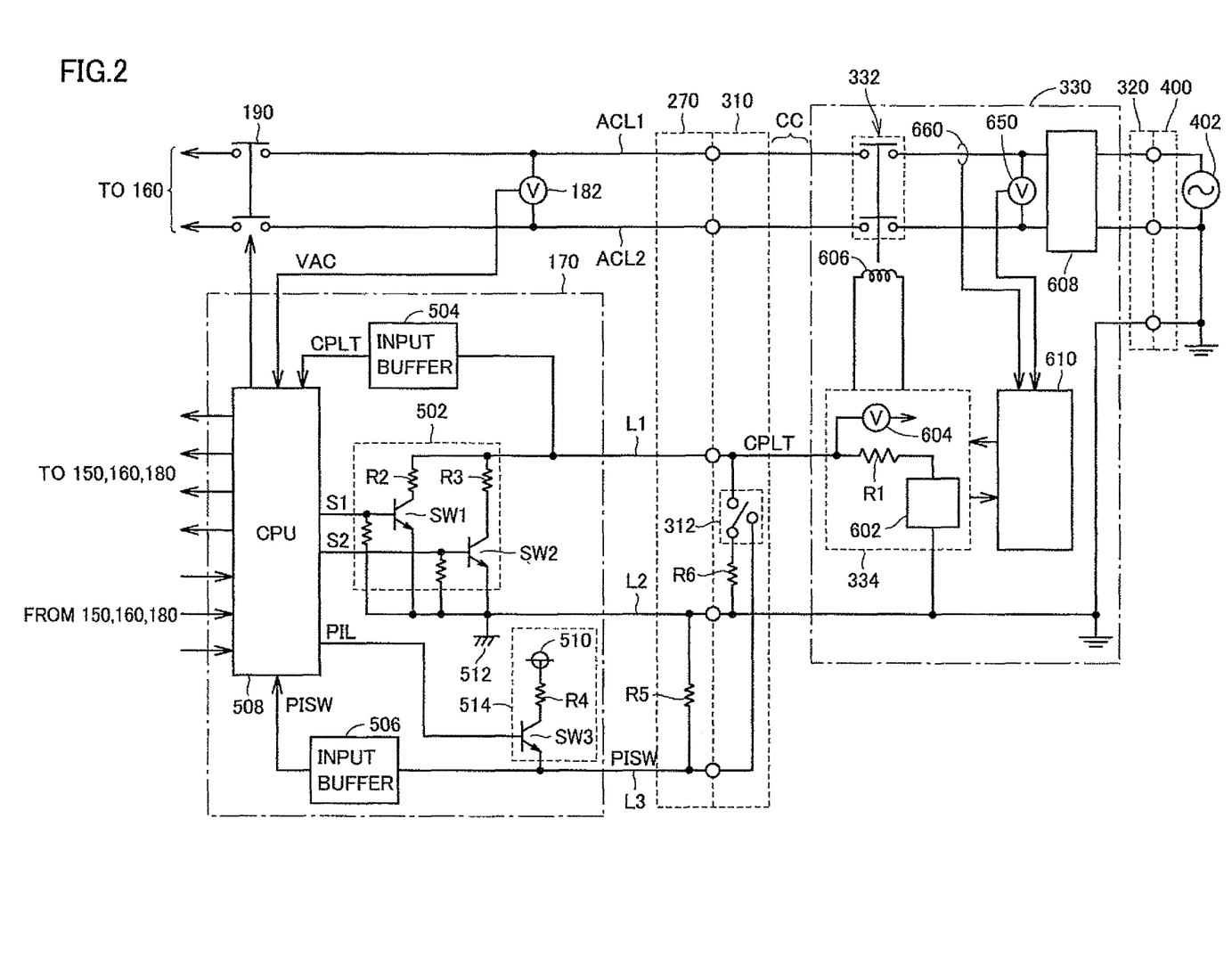
FIG. 2 illustrates a charging structure shown in FIG. 1 more in detail.

FIG. 2 illustrates the charging structure shown in FIG. 1 more in detail.

Referring to FIG. 2, in addition to CCID relay 332 and control pilot circuit 334, CCID 330 includes a magnetic coil 606, an electrical leakage detector 608, CCID control unit 610, a voltage sensor 650, and a current sensor 660. Further, control pilot circuit 334 includes an oscillator 602, a resistance element R1, and a voltage sensor 604.

CCID control unit 610 includes a CPU (Central Processing Unit), a memory device, an input/output buffer, and an indicator, each of which is not shown. CCID control unit 610 sends/receives a signal to/from each sensor and control pilot circuit 334, and controls and manages a charging operation of charging cable 300.

Oscillator 602 outputs a non-oscillating signal when the potential of pilot signal CPLT detected by voltage sensor 604 is around a predetermined potential V1 (for example 12V), and outputs a signal oscillating at predetermined frequency (for example 1 kHz) and duty cycle when the potential of pilot signal CPLT is decreased from V1.

It should be noted that the potential of pilot signal CPLT can be controlled from ECU 170 of the vehicle as described below. The duty cycle is set based on a rated current that can be supplied from external power source 402 to the vehicle via the charging cable.

Figure 3:
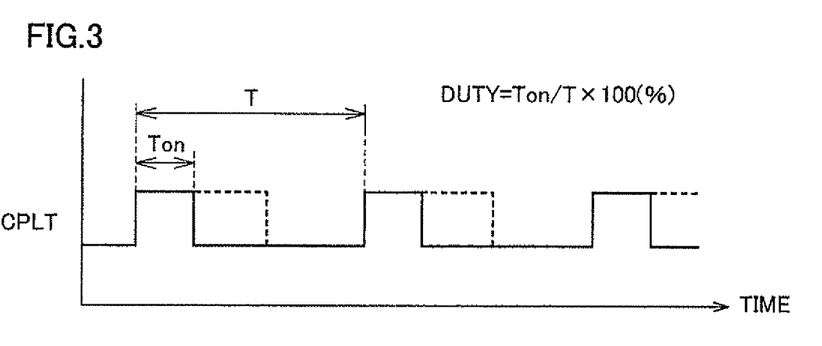
FIG. 3 shows an exemplary waveform of a pilot signal generated by a control pilot circuit shown in FIG. 2.

FIG. 3 illustrates an exemplary waveform of pilot signal CPLT generated by control pilot circuit 334 shown in FIG. 2.

Referring to FIG. 3, pilot signal CPLT oscillates at a predetermined cycle T when the potential of pilot signal CPLT is decreased from V1 as described above. Here, pulse width Ton of pilot signal CPLT is set based on the rated current that can be supplied from external power source 402 to electrically powered vehicle 10 via charging cable 300. Namely, by means of the duty of pilot signal CPLT represented by a ratio of pulse width Ton to cycle T, ECU 170 of electrically powered vehicle 10 is notified of the rated current from control pilot circuit 334.

It should be noted that the rated current is set for each charging cable. When a different type of charging cable is used, the rated current differs. Hence, the duty of pilot signal CPLT differs for each charging cable.

Based on the duty of pilot signal CPLT received via a control pilot wire L1, ECU 170 of electrically powered vehicle 10 can detect the rated current that can be supplied from external power source 402 to the vehicle via charging cable 300.

Referring to FIG. 2 again, when ECU 170 causes decrease of the potential of pilot signal CPLT to around a predetermined potential V3 (for example 6V), control pilot circuit 334 supplies a current to magnetic coil 606. When supplied with the current from control pilot circuit 334, magnetic coil 606 generates electromagnetic force to bring CCID relay 332 into the on state.

Electrical leakage detector 608 is provided in CCID 330 for the pair of power lines of the charging cable to detect whether or not electrical leakage has occurred. Specifically, electrical leakage detector 608 detects a state of balance of currents flowing in the pair of power lines in opposite directions, and detects occurrence of electrical leakage when the state of balance is lost. Although it is not particularly shown in the figure, when electrical leakage detector 608 detects electrical leakage, the supply of electric power to magnetic coil 606 is interrupted to turn off CCID relay 332.

Voltage sensor 650 detects that plug 320 of charging cable 300 for the external power source is inserted into power source receptacle 400 and is therefore connected to external power source 402, and notifies COD control unit 610 of it.

Current sensor 660 detects a charging current flowing in a power line to detect actual start of charging from external power source 402 to electrically powered vehicle 10, and notifies CCID control unit 610 of it.

Meanwhile, in the vehicle, ECU 170 includes a resistance circuit 502, input buffers 504, 506, and a CPU 508. Resistance circuit 502 includes pull-down resistors R2, R3, and switches SW1, SW2. Pull-down resistor R2 and switch SW1 are connected in series between control pilot wire L1, via which pilot signal CPLT is communicated, and a vehicular earth 512. Pull-down resistor R3 and switch SW2 are also connected in series between control pilot wire L1 and vehicular earth 512. Switches SW1, SW2 are turned on/off according to control signals S1, S2 from CPU 508.

Resistance circuit 502 is a circuit adapted to control the potential of pilot signal CPLT from the vehicle side. In other words, when charging connector 310 is connected to vehicular inlet 270, switch SW2 is turned on according to control signal S2 and resistance circuit 502 decreases the potential of pilot signal CPLT to a predetermined potential V2 (for example 9V) using pull-down resistor R3. Further, when check for welding of the relay and the like is completed in electrically powered vehicle 10, switch SW1 is turned on according to control signal S1 and resistance circuit 502 decreases the potential of pilot signal CPLT to a predetermined potential V3 (for example 6V) using pull-down resistors R2, R3. By controlling the potential of pilot signal CPLT using resistance circuit 502 as such, CCID relay 332 can be remotely controlled from ECU 170.

By detecting change in the potential of pilot signal CPLT from 0 V to predetermined potential V1, CCID control unit 610 can detect that plug 320 of charging cable 300 has been brought into connection with power source receptacle 400. Further, by detecting change in the potential of pilot signal CPLT from predetermined potential V1 to V2, CCID control unit 610 can detect that charging connector 310 of charging cable 300 has been brought into connection with vehicular inlet 270 of electrically powered vehicle 10.

Further, ECU 170 includes a connection signal generating circuit 514 for generating cable connection signal PISW, which indicates that charging connector 310 has been brought into connection with vehicular inlet 270. Connection signal generating circuit 514 includes a power source node 510, a pull-up resistor R4, and a switch SW3. Pull-up resistor R4 and switch SW3 are connected in series between power source node 510 and a cable connection signal wire L3, via which cable connection signal PISW is communicated. Switch SW3 is turned on/off according to a control signal PIL provided from CPU 508.

Inside charging connector 310, a pull-down resistor R6 and a limit switch 312 are connected in series between each of cable connection signal wire L3 and control pilot wire L1 and ground wire L2 connected to vehicular earth 512. Limit switch 312 is capable of switching the connection between ground wire L2 and each of control pilot wire L1 and cable connection signal wire L3. Further, in vehicular inlet 270, a pull-down resistor R5 is connected between cable connection signal wire L3 and ground wire L2.

In such a configuration, by turning on switch SW3 within connection signal generating circuit 514 when charging connector 310 is not connected to vehicular inlet 270, there is generated in cable connection signal wire L3 a voltage obtained by dividing a voltage of power source node 510 by pull-up resistor R4 and pull-down resistor R5 provided within vehicular inlet 270.

In contrast, when charging connector 310 is connected to vehicular inlet 270, limit switch 312 electrically connects ground wire L2 and cable connection signal wire L3 to each other, whereby cable connection signal wire L3 has a potential corresponding to a voltage determined by a voltage of power source node 510, pull-up resistor R4, and pull-down resistors R5, R6. In other words, the potential of cable connection signal wire L3 changes between a case where charging connector 310 is connected to vehicular inlet 270 and a case where charging connector 310 is not connected thereto.

Input buffer 504 receives pilot signal CPLT from control pilot wire L1, and sends the received pilot signal CPLT to CPU 508. Input buffer 506 receives cable connection signal PISW from cable connection signal wire L3, and sends the received cable connection signal PISW to CPU 508.

Based on cable connection signal PISW and pilot signal CPLT, CPU 508 makes determination as to connection between external power source 402 and electrically powered vehicle 10. Specifically, CPU 508 detects connection between vehicular inlet 270 and charging connector 310 based on cable connection signal PISW received from input buffer 506, and detects connection between plug 320 and power source receptacle 400 based on presence/absence of pilot signal CPLT received from input buffer 504.

When the connection between vehicular inlet 270 and charging connector 310 is detected based on cable connection signal PISW, CPU 508 activates control signal S2. Accordingly, the potential of pilot signal CPLT decreases from V1, whereby pilot signal CPLT oscillates. Then, CPU 508 detects based on the duty cycle of pilot signal CPLT a rated current that can be supplied from external power source 402 to electrically powered vehicle 10.

When the rated current is detected, CPU 508 activates control signal S1. Accordingly, the potential of pilot signal CPLT is decreased to V3, thereby turning on CCID relay 332 in CCID 330. Thereafter, CPU 508 turns on relay 190 (FIG. 1). In this way, power converter 160 for charging (FIG. 1) is supplied with alternating-current power from external power source 402, thus completing preparation of charging from external power source 402 to power storage device 150 (FIG. 1). Then, CPU 508 sends a control signal to power converter 160 for charging (FIG. 1) to start electric power conversion. In this way, power storage device 150 (FIG. 1) is charged.

Figure 4:
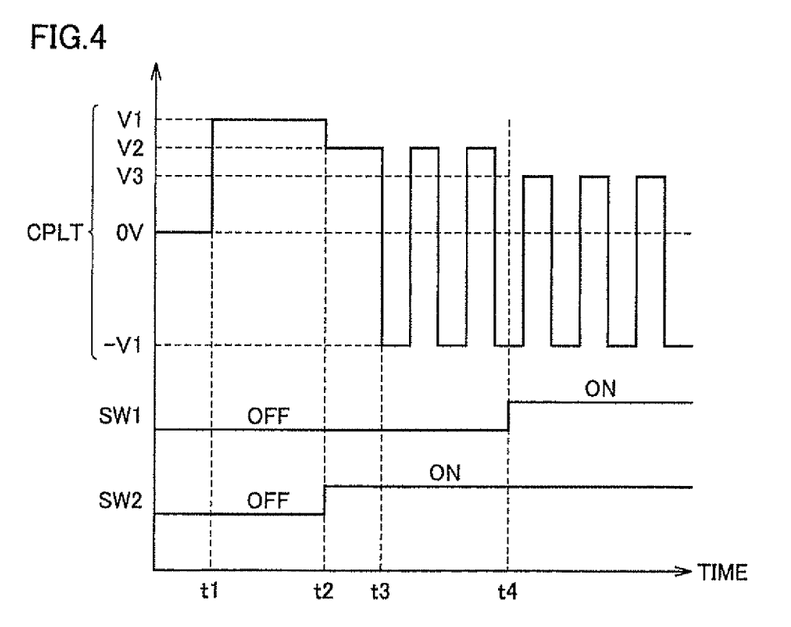
FIG. 4 is a timing chart of the pilot signal and switches at the start of charging.

Next, change in the potential of pilot signal CPLT will be described with reference to FIG. 4. FIG. 4 is a timing chart of pilot signal CPLT and switches SW1, SW2 upon the start of charging.

Referring to FIG. 4 and FIG. 2, when plug 320 of charging cable 300 is connected to power source receptacle 400 of external power source 402 at time t1, control pilot circuit 334 receives electric power from external power source 402 and generates pilot signal CPLT.

At time t1, charging connector 310 of charging cable 300 is not connected to vehicular inlet 270, the potential of pilot signal CPLT is V1 (for example 12V), and pilot signal CPLT is not in the oscillating state. CCID control unit 610 detects the change of the potential of pilot signal CPLT to V1, thereby detecting that plug 320 has been brought into connection with power source receptacle 400.

At time t2, when charging connector 310 is connected to vehicular inlet 270, the connection between charging connector 310 and vehicular inlet 270 is detected based on cable connection signal PISW. In response to this, CPU 508 turns on switch SW2. Accordingly, the potential of pilot signal CPLT is decreased to V2 (for example 9V) by pull-down resistor R3 of resistance circuit 502.

With the potential of pilot signal CPLT being decreased to V2, CCID control unit 610 can detect that charging connector 310 has been brought into connection with vehicular inlet 270. Then, at time t3, control pilot circuit 334 causes pilot signal CPLT to oscillate.

When pilot signal CPLT is brought into the oscillating state, CPU 508 detects the rated current based on the duty of pilot signal CPLT. Thereafter, when the preparation for control of charging is completed in the vehicle, CPU 508 turns on switch SW1 at time t4. Accordingly, the potential of pilot signal CPLT is decreased to V3 (for example 6V) by pull-down resistors R2 and R3 of resistance circuit 502.

When the potential of pilot signal CPLT is decreased to V3, a current is supplied from control pilot circuit 334 to magnetic coil 606 to turn on relay 332 of CCID 330. Thereafter, by the above-described control by CPU 508, power storage device 150 is charged from external power source 402.

Since the change in the potential of pilot signal CPLT as shown in FIG. 4 is standardized by the SAE Standards, change in the potential upon charging is controlled to be similar even among different manufacturers and different cars. Thus, the charging cable can be shared among different manufacturers and different cars.

It should be noted that in the present embodiment, pilot signal CPLT corresponds to a "control signal" and cable connection signal PISW corresponds to a "connection signal". In addition, control pilot wire L1 corresponds to a "first control wire", cable connection signal wire L3 corresponds to a "second control wire", and ground wire L2 corresponds to a "ground wire".

The description above deals with the case where plug 320 for the external power source is connected before charging connector 310 for the vehicle is connected. However, even when charging connector 310 for the vehicle is connected before plug 320 for the external power source is connected, CPU 508 in electrically powered vehicle 10 turns on switch SW2 after receiving and confirming pilot signal CPLT from CCID 330. Hence, change in the potential of pilot signal CPLT is similar to that in FIG. 4.

First Embodiment

Figure 5:
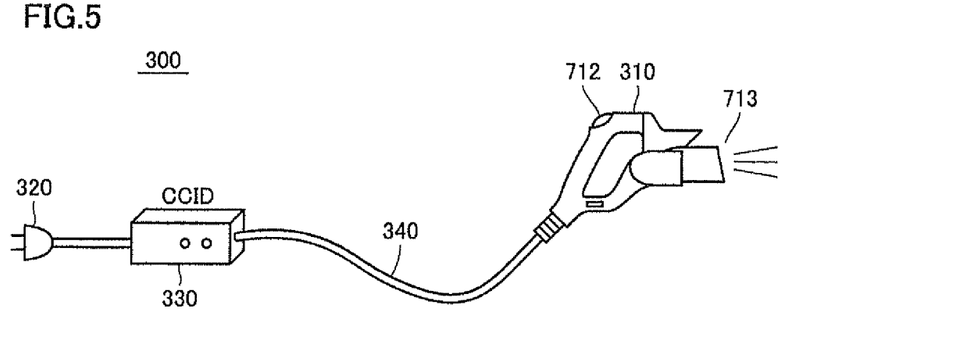
FIG. 5 schematically shows an external appearance of a charging cable according to a first embodiment.
Figure 6:
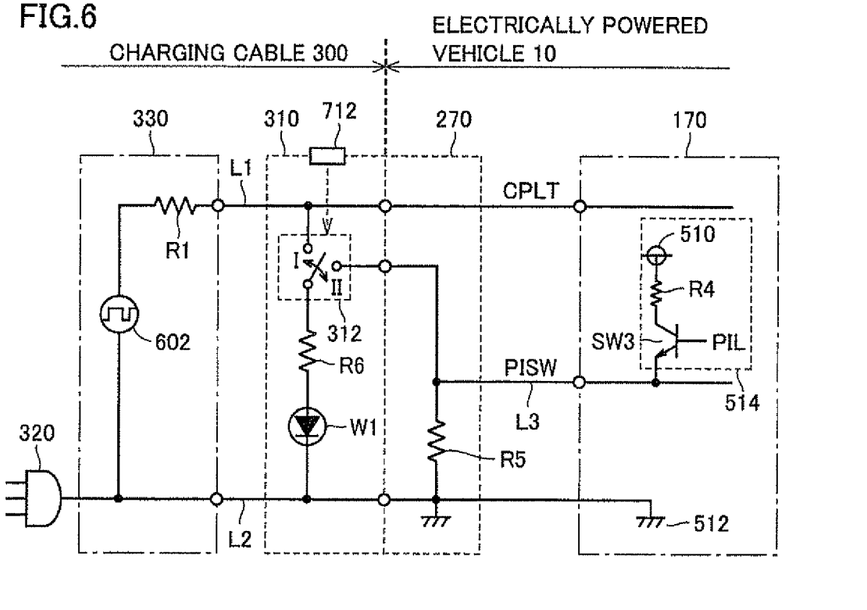
FIG. 6 shows a portion at which a part of the charging cable and an ECU of the vehicle are connected.

The following describes a configuration of charging cable 300 according to a first embodiment of the present invention with reference to FIG. 5 and FIG. 6.

FIG. 5 schematically shows an external appearance of charging cable 300 according to the first embodiment.

Referring to FIG. 5, charging cable 300 includes plug 320 to be connected to a power source external to the vehicle; CCID 330; electric wire unit 340; and charging connector 310. Charging connector 310 has a connection unit 713 to be connected to the vehicle. Charging connector 310 is provided with a lighting device for emitting light in the same direction as the direction in which connection unit 713 is connected thereto.

Preferably, charging connector 310 is connected to one end of electric wire unit 340. To the other end of electric wire unit 340, plug 320 is connected as a connection unit to be connected to the power source. Between charging connector 310 and plug 320 in electric wire unit 340, CCID 330 is provided.

Charging connector 310 is provided with a lock button 712. A locking mechanism not shown in the figure is provided therein to prevent charging connector 310 from being detached from the vehicle even if force of pulling it out is exerted after charging connector 310 is connected to the vehicle. By pushing lock button 712, charging connector 310 connected to the vehicle can be detached therefrom.

The lighting device, provided in or in the vicinity of connection unit 713, facilitates the operation of connecting charging connector 310 to the vehicle at the start of charging at nighttime.

FIG. 6 shows a portion at which a part of charging cable 300 and ECU 170 of the vehicle are connected to each other. FIG. 6 shows a portion of the configuration shown in FIG. 2 in a simplified manner, to indicate a location in which a light emitting diode element is provided as the lighting device.

Referring to FIG. 2 and FIG. 6, charging cable 300 will be described which connects an external power source to electrically powered vehicle 10 in order to charge the power storage device provided in electrically powered vehicle 10 by means of the power source.

Charging cable 300 includes charging connector 310 configured to be connectable to vehicular inlet 270, plug 320 to be connected to the power source, and electric wire unit 340 provided between charging connector 310 and plug 320.

Electric wire unit 340 includes a power line (not shown) for supplying electric power from the power source to electrically powered vehicle 10; a control pilot wire L1 for communicating pilot signal CPLT; and a ground wire L2 connected to vehicular earth 512.

Charging connector 310 includes limit switch 312, pull-down resistor R6, and lighting device W1, which are connected in series between control pilot wire L1 and ground wire L2.

Limit switch 312 is capable of switching connection between ground wire L2 and each of control pilot wire L1 and cable connection signal wire L3. Specifically, when limit switch 312 is controlled to switch to a side I, control pilot wire L1 is electrically connected to ground wire L2. On the other hand, when limit switch 312 is controlled to switch to a side II, cable connection signal wire L3 is electrically connected to ground wire L2.

Between limit switch 312 and ground wire L2, pull-down resistor R6 and lighting device W1 are provided. Lighting device W1 is constituted by, for example, a lamp that employs a light emitting diode element, and presents states of lighting up, blinking, and lighting out. When limit switch 312 is switched to side I, the potential of pilot signal CPLT in control pilot wire L1 is applied to light up lighting device W1. When limit switch 312 is switched to side II, the potential of cable connection signal PISW in cable connection signal wire L3 is applied to light up lighting device W1. In other words, lighting device W1 is configured so that it is capable of lighting up using signals CPLT, PISW, each of which is standardized in terms of charging of electrically powered vehicle 10.

Whether to connect limit switch 312 to side I or side II is controlled according to an operation onto lock button 712 provided in charging connector 310. As described above, lock button 712 can be operated between the lock state and the release state. When lock button 712 is pressed, lock button 712 is brought into the release state, thus allowing charging connector 310 to be detached from electrically powered vehicle 10. By taking off a hand from lock button 712, lock button 712 is in the lock state, thus locking charging connector 310 to prevent charging connector 310 from being detached from vehicular inlet 270 when connected thereto. In the release state of lock button 712, limit switch 312 is switched to side I, whereas in the lock state of lock button 712, it is switched to side II.

With such a configuration, when lock button 712 is pressed before connecting charging connector 310, limit switch 312 is switched to side I to connect control pilot wire L1 to ground wire L2. Accordingly, lighting device W1 receives the potential of pilot signal CPLT and is lit up. In this case, lighting device W1 serves as a light for providing illumination in the same direction in which connection unit 713 of charging connector 310 is connected.

By taking off a hand from lock button 712 after connecting charging connector 310 to vehicular inlet 270, limit switch 312 is switched to side II, thereby connecting cable connection signal wire L3 to ground wire L2. Accordingly, lighting device W1 is electrically separated from control pilot wire L1 and is therefore lit out. In other words, in addition to the above-described function as a light, lighting device W1 also serves as a notifying unit for notifying a user that charging connector 310 has been locked.

If charging connector 310 and vehicular inlet 270 are not engaged completely and charging connector 310 is therefore not locked to vehicular inlet 270, limit switch 312 is controlled to switch to side I. Accordingly, the potential of control pilot wire L1 (the potential of pilot signal CPLT) is decreased to be smaller than predetermined potential V1 (for example 12±0.6 V). On this occasion, CCID 330 detects the decrease of the potential using voltage sensor 604 (FIG. 2), thus determining that charging connector 310 and vehicular inlet 270 are partially engaged. In other words, both ECU 170 of the vehicle and CCID 330 of charging cable 300 can make determination as to connection between charging connector 310 and vehicular inlet 270. As a result, when charging connector 310 and vehicular inlet 270 are partially engaged with each other, the power storage device can be prohibited from being charged.

When lock button 712 is brought into the lock state and charging connector 310 is locked to vehicular inlet 270, lighting device W1 blinks/is lit out according to the potential of cable connection signal wire L3 (the potential of cable connection signal PISW) as described below.

Specifically, after charging connector 310 is connected, the potential of cable connection signal PISW is changed in response to switch SW3 in ECU 170 being turned on/off according to control signal PIL output from CPU 508 (not shown).

Control signal PIL is a signal, which is at the H (logic high) level when the power storage device is being charged and is at the L (logic low) level when the power storage device is not being charged. Thus, when the power storage device is being charged, switch SW3 receives control signal PIL of the H level and is accordingly turned on, thus generating in cable connection signal wire L3 a voltage determined by a voltage of power source node 510, pull-up resistor R4, and pull-down resistors R5, R6 connected to ground wire L2. Lighting device W1 receives the potential thus generated in cable connection signal wire L3, and is accordingly lit up.

On the other hand, when the power storage device is not being charged, switch SW3 receives control signal PIL of the L level and is therefore turned off, whereby the potential of cable connection signal wire L3 is at a ground level. Accordingly, lighting device W1 is lit out.

Namely, when charging connector 310 is connected to vehicular inlet 270 and the power storage device is being charged, cable connection signal PISW is at the H level. On the other hand, when charging connector 310 is connected thereto but the power storage device is not being charged, cable connection signal PISW is at the L level. When lighting device W1 receives the potential of cable connection signal PISW, it is lit up/lit out. In this case, lighting device W1 serves as a presentation unit for presenting a state as to whether or not the power storage device is being charged.

As such, in the first embodiment, before charging connector 310 is connected, lighting device W1 serves as a light for supporting charging of electrically powered vehicle 10 at nighttime, and also serves as a notifying unit for notifying that charging connector 310 has been locked. Lighting device W1 is configured to function as a presentation unit for presenting a state as to whether or not the power storage device is being charged, after charging connector 310 is connected. It should be noted that such a configuration can be implemented by selectively applying the potentials of pilot signal CPLT and cable connection signal PISW to lighting device W1 in accordance with the connection state of charging connector 310. Since lighting device W1 is lit up using the signals standardized as to charging of electrically powered vehicle 10 as such, no power source and wires dedicated to an illumination device need to be provided. Accordingly, a scale of a circuit contained in the charging connector can be avoided from being large.

Further, since the connection of limit switch 312 is switched according to the operation state of lock button 712, lighting device W1 can be lit up without adding an extra operation unit.

It should be noted that in the above-described embodiment, control signal PIL sent from CPU 508 of the vehicle to switch SW3 is a signal which is activated to the H level when the power storage device is being charged. However, control signal PIL may be a pulse signal which is switched at a predetermined cycle between the H level and the L level when it is detected that charging connector 310 and vehicular inlet 270 are partially engaged with each other. In this case, lighting device W1 blinks at this predetermined cycle, thus presenting that a malfunction has occurred in charging the power storage device. In other words, lighting device W1 is capable of presenting the following three operation states regarding the power storage device: a state of being charged, a state of not being charged, and a state of malfunction in charging.

Variation of First Embodiment

Figure 7:
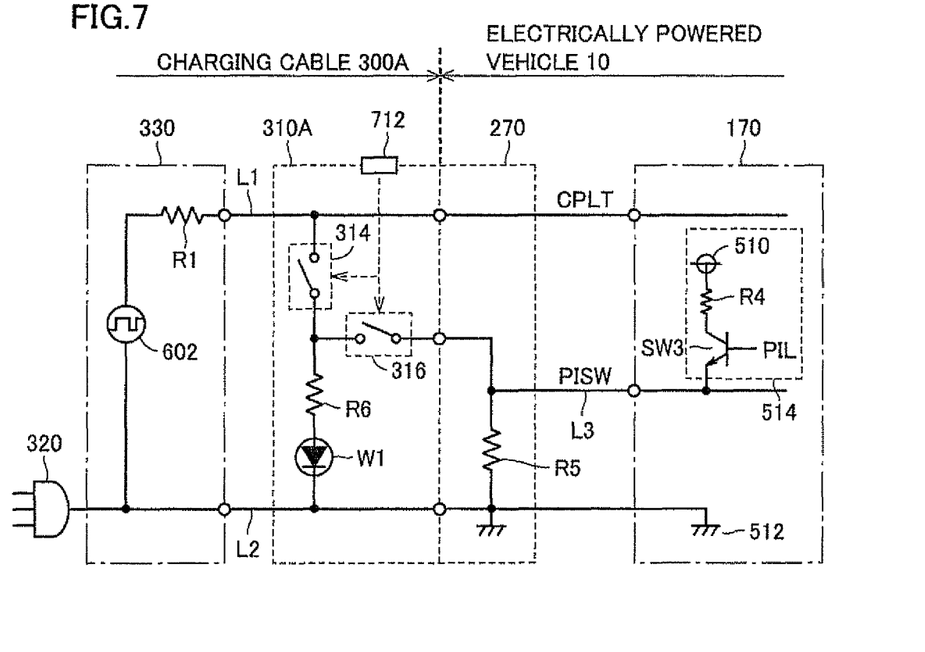
FIG. 7 is a circuit diagram showing a charging cable of a variation of the first embodiment.

FIG. 7 is a circuit diagram showing a configuration of a charging cable according to a variation of the first embodiment. Referring to FIG. 7, charging cable 300A according to the present variation is different from charging cable 300 shown in FIG. 6, in that it includes a charging connector 310A instead of charging connector 310.

Charging connector 310A includes a lock button 712 for locking charging connector 310A to vehicular inlet 270; a switch 314 for connecting control pilot wire L1 and ground wire L2 according to an operation onto lock button 712; and a switch 316 for connecting cable connection signal wire L3 and ground wire L2 to each other according to an operation onto lock button 712.

Switch 314 electrically connects control pilot wire L1 and ground wire L2 to each other in the release state, and electrically separates control pilot wire L1 and ground wire L2 from each other in the lock state.

Switch 316 operates in a manner complementary to switch 314. Namely, switch 316 electrically separates cable connection signal wire L3 and ground wire L2 from each other in the release state, and electrically connects cable connection signal wire L3 and ground wire L2 to each other in the lock state. As such, switch 314 and switch 316 are operated in the complementary manner according to an operation onto lock button 712, thereby implementing a switching function similar to that of limit switch 312 in FIG. 6.

Further, pull-down resistor R6 and lighting device W1 are also provided between each of switches 314, 316 and ground wire L2. Hence, also in the present variation, before charging connector 310 is connected, lighting device W1 serves as a light for supporting charging of electrically powered vehicle 10 at nighttime, and a notifying unit for notifying that charging connector 310 has been locked. After charging connector 310 is connected, it serves as a presentation unit for presenting a state as to whether or not the power storage device is being charged.

Second Embodiment

Figure 8:
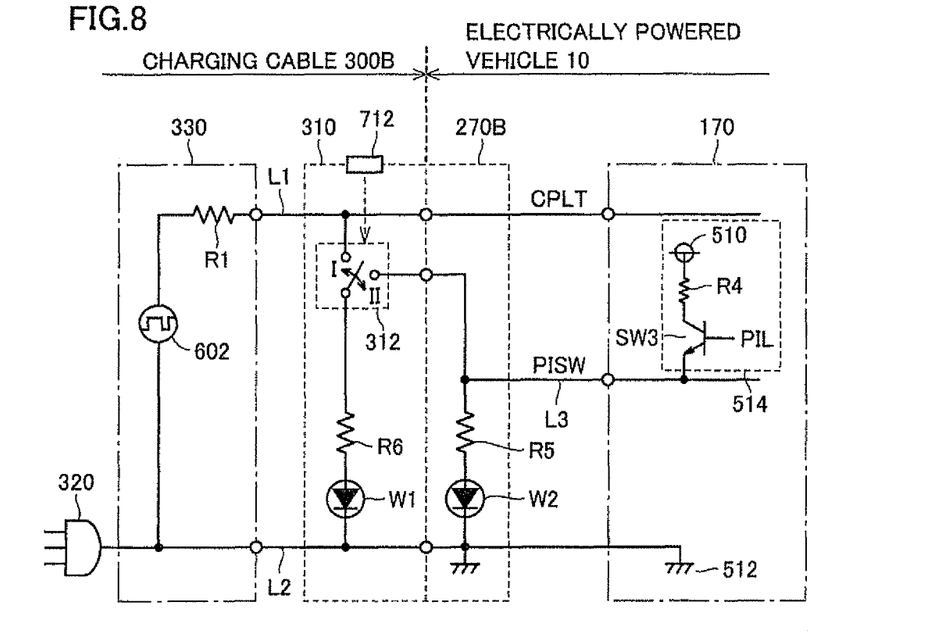
FIG. 8 is a circuit diagram showing configurations of a charging cable and a charging system for an electrically powered vehicle, according to a second embodiment of the present invention.

FIG. 8 is a circuit diagram showing configurations of a charging cable and a charging system for an electrically powered vehicle 10, according to a second embodiment of the present invention. Referring to FIG. 8, charging cable 300B according to the second embodiment is the same as charging cable 300 shown in FIG. 6. The second embodiment is different in that in the vehicle, vehicular inlet 270 connected to the charging cable is replaced with a vehicular inlet 270B.

Vehicular inlet 270B includes a pull-down resistor R5 and a lighting device W2, which are connected in series between cable connection signal wire L3 and ground wire L2.

Lighting device W2 is constituted by, for example, a lamp that employs a light emitting diode element. Although not illustrated in the figure, vehicular inlet 270B includes a connection unit connected to charging cable 300B, and a cover for preventing water, dust particles, and the like from entering the connection unit. Lighting device W2 is provided in the vicinity of this cover.

In such a configuration, lighting device W2 is lit up/lit out according to the potential of cable connection signal wire L3 (the potential of cable connection signal PISW). Specifically, as described above, ECU 170 includes, as connection signal generating circuit 514, power source node 510, pull-up resistor R4, and switch SW3, which is turned on/off according to control signal PIL from CPU 508. In this configuration, when switch SW3 is turned on, the potential of cable connection signal wire L3 (the potential of cable connection signal PISW) is changed between a case where charging connector 310 is connected to vehicular inlet 270 and a case where charging connector 310 is not connected to vehicular inlet 270. The potential of cable connection signal PISW is applied to lighting device W2 to light up lighting device W2. In this way, lighting device W2 serves as a guidance light for guiding a user to vehicular inlet 270.

Lighting device W2 thus lit up using cable connection signal PISW facilitates an operation of connecting charging connector 310 to electrically powered vehicle 10 at the start of charging at nighttime, without providing a power source or wires dedicated to the guidance light.

It should be noted that in the present embodiment, the lighting devices are provided for charging connector 310 and vehicular inlet 270 respectively, but only vehicular inlet 270 may be provided with lighting device W2. In this case, lighting device W2 serves as a guidance light as described above and also serves as a presentation unit for presenting a state as to whether or not the power storage device is being charged.

Third Embodiment

Figure 9:
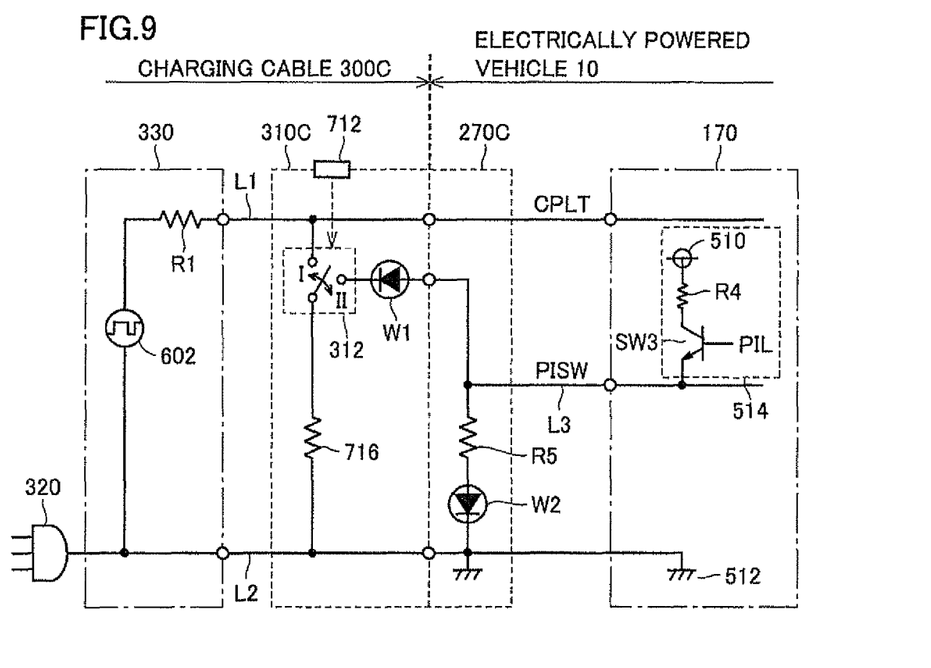
FIG. 9 is a circuit diagram showing configurations of a charging cable and a charging system for an electrically powered vehicle, according to a third embodiment of the present invention.

FIG. 9 is a circuit diagram showing configurations of a charging cable and a charging system for an electrically powered vehicle 10 of a third embodiment of the present invention. Referring to FIG. 9, charging cable 300C according to the third embodiment is different from charging cable 300B shown in FIG. 8, in that it includes a charging connector 310C instead of charging connector 310. Meanwhile, vehicular inlet 270C is the same as vehicular inlet 270B shown in FIG. 8.

Charging connector 310C includes a limit switch 312 and a pull-down resistor R6, which are connected in series between control pilot wire L1 and ground wire L2, as well as lighting device W1.

Limit switch 312 is capable of switching connection between ground wire L2 and each of control pilot wire L1 and cable connection signal wire L3 according to an operation on lock button 712 as described above.

Lighting device W1 is provided between limit switch 312 and cable connection signal wire L3. Hence, when limit switch 312 is controlled to switch to side II, i.e., when lock button 712 is brought into the lock state and charging connector 310C is therefore locked to vehicular inlet 270, the potential of cable connection signal wire L3 is applied to lighting device W1.

In such a configuration, when the power storage device is being charged, lighting device W1 receives the potential generated in cable connection signal wire L3, and is accordingly lit up. Meanwhile, when the power storage device is not being charged, the potential of cable connection signal wire L3 is at a ground level and lighting device W1 is therefore lit out. Namely, lighting device W1 is lit up/lit out according to the potential of cable connection signal PISW, thus serving as a presentation unit for presenting a state as to whether or not the power storage device is being charged.

Since lighting device W1 is provided between limit switch 312 and cable connection signal wire L3 as such, lighting device W1 can be lit up only when charging connector 310C is locked to vehicular inlet 270. Hence, as compared with the configuration in which lighting device W1 is provided between limit switch 312 and ground wire L2, lighting device W1 is never lit up when charging connector 310C and vehicular inlet 270 are partially engaged with each other. Thus, the partial engagement of charging connector 310C and vehicular inlet 270 can be prevented from being erroneously recognized that the power storage device is being charged.

Meanwhile, as compared with the configuration in which lighting device W1 is provided between limit switch 312 and ground wire L2, lighting device W1 does not have a function as a light for illuminating the vehicular inlet, but lighting device W2 provided in vehicular inlet 270C serves as a guidance light, thus supporting charging of the electrically powered vehicle at nighttime.

It should be noted that in each of the above-described embodiments, the CCID is provided in the middle of the charging cable, but may not be provided therein. The CCID may be integrated with the charging connector to be connected to an electrically powered vehicle, or may be integrated with the plug to be connected to an external power source.

It should be considered that the embodiments and examples disclosed herein are illustrative and non-restrictive in any respect. The scope of the present invention is defined by the scope of claims rather than the description above, and is intended to include any modifications within the scope and meaning equivalent to the terms of the claims.

INDUSTRIAL APPLICABILITY

The present invention is applicable to a charging cable and a charging system for an electrically powered vehicle.

REFERENCE SIGNS LIST

10: electrically powered vehicle; 120: MG; 130: vehicular wheels; 150: power storage device; 160: power converter; 180: motor driving device; 182: voltage sensor; 190: relay; 270, 270B, 270C: vehicular inlet; 300, 300A-300C: charging cable; 310, 310A, 310C: charging connector; 312: limit switch; 314, 316: switch; 320: plug; 332: relay; 334: control pilot circuit; 340, 340a, 340b:

electric wire unit; 400: power source receptacle; 402: external power source; 502: resistance circuit; 504, 506: input buffer; 510: power source node; 512: vehicular earth; 602: oscillator; 604, 650: voltage sensor; 606: magnetic coil; 608: electrical leakage detector; 610: CCID control unit; 660: current sensor; 712: lock button; 713: connection unit; CPLT: pilot signal; L1: control pilot wire; L2: ground wire; L3: cable connection signal wire; PISW: cable connection signal; R1: resistance element; R2, R3, R5, R6: pull-down resistor; R4: pull-up resistor; SW1-SW3: switch; W1, W2: lighting device.

The invention claimed is:

1. A charging cable for connecting a power source external to an electrically powered vehicle to said electrically powered vehicle, in order to charge a power storage device mounted on said electrically powered vehicle from said power source, the charging cable comprising:
a charging connector configured to be connectable to a charging inlet provided in said electrically powered vehicle;
a plug configured to be connectable to said power source; and
an electric wire unit provided between said charging connector and said plug,
said electric wire unit including
a power line for supplying electric power from said power source to said electrically powered vehicle,
a first control wire for communicating a control signal representing information regarding electric power supplied to said electrically powered vehicle, and
a ground wire connected to a vehicular earth,
said charging connector including
a lock button for locking said charging connector onto said charging inlet,
a switching circuit configured to be switchable, according to an operation onto said lock button, between a first state in which said first control wire and said ground wire are connected to each other and a second state in which a second control wire for communicating a connection signal and said ground wire are connected to each other, said connection signal indicating a connection state of said charging cable, and
a lighting device configured to be capable of being driven according to a signal in a corresponding control wire upon at least one of said first state and said second state.

2. The charging cable according to claim 1, wherein:
said lock button is operable between a lock state and a release state, and
said switching circuit is brought into said first state upon said release state, and is brought into said second state upon said lock state.

3. The charging cable according to claim 2, wherein:
said second control wire is configured to be capable of changing a potential of said connection signal according to a state as to whether or not said power storage device is being charged, when said charging connector is connected to said charging inlet, and
said lighting device is provided between said switching circuit and said ground wire and is configured to illuminate said charging inlet.

4. The charging cable according to claim 2, wherein:
said second control wire is configured to be capable of changing a potential of said connection signal according to a state as to whether or not said power storage device is being charged, when said charging connector is connected to said charging inlet, and
said lighting device is provided between said switching circuit and said second control wire.

5. A charging system for an electrically powered vehicle, configured to be capable of charging a power storage device mounted on an electrically powered vehicle from a power source external to the vehicle, the charging system comprising:
a charging cable for connecting said power source to said electrically powered vehicle;
a charging inlet provided in said electrically powered vehicle and configured to allow said charging cable to be connected thereto;
a connection signal generating circuit provided in said electrically powered vehicle and configured to be capable of generating a connection signal indicating a connection state of said charging cable; and
a charging device mounted on said charging cable and configured to be capable of generating a control signal representing information regarding electric power supplied to said electrically powered vehicle and transmitting said control signal to said electrically powered vehicle,
said charging cable including
a charging connector configured to be connectable to said charging inlet,
a plug configured to be connectable to said power source, and
an electric wire unit provided between said charging connector and said plug,
said electric wire unit including
a power line for supplying electric power from said power source to said electrically powered vehicle,
a first control wire for communicating said control signal, and
a ground wire connected to a vehicular earth,
said charging connector including
a lock button for locking said charging connector onto said charging inlet,
a switching circuit configured to be switchable, according to an operation onto said lock button, between a first state in which said first control wire and said ground wire are connected to each other and a second state in which a second control wire for communicating said connection signal and said ground wire are connected to each other, and
a first lighting device configured to be capable of being driven according to a signal in a corresponding control wire upon at least one of said first state and said second state.

6. The charging system for an electrically powered vehicle according to claim 5, wherein:
said lock button is operable between a lock state and a release state, and
said switching circuit is brought into said first state upon said release state, and is brought into said second state upon said lock state.

7. The charging system for an electrically powered vehicle according to claim 6, wherein:
said connection signal generating circuit is configured to be capable of changing a potential of said connection signal according to a state as to whether or not said power storage device is being charged, when said charging connector is connected to said charging inlet, and
said first lighting device is provided between said switching circuit and said ground wire, and is configured to illuminate said charging inlet.

8. The charging system for an electrically powered vehicle according to claim 6, wherein:
   said connection signal generating circuit is configured to be capable of changing a potential of said connection signal according to a state as to whether or not said power storage device is being charged, when said charging connector is connected to said charging inlet, and
   said first lighting device is provided between said switching circuit and said second control wire.

9. The charging system for an electrically powered vehicle according to claim 7, wherein said charging inlet includes a second lighting device configured to be capable of being driven according to said connection signal in said second control wire upon said second state.

10. The charging system for an electrically powered vehicle according to claim 8, wherein said charging inlet includes a second lighting device configured to be capable of being driven according to said connection signal in said second control wire upon said second state.

* * * * *